US010468649B2

(12) United States Patent
Choi et al.

(10) Patent No.: US 10,468,649 B2
(45) Date of Patent: Nov. 5, 2019

(54) BATTERY CASE, AND BATTERY PACK AND VEHICLE INCLUDING THE SAME

(71) Applicant: LG CHEM, LTD., Seoul (KR)

(72) Inventors: Seung-Ryul Choi, Daejeon (KR); Do-Gyun Kim, Daejeon (KR); Ho-Seoung Son, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/132,967

(22) Filed: Sep. 17, 2018

(65) Prior Publication Data

US 2019/0088914 A1    Mar. 21, 2019

(30) Foreign Application Priority Data

Sep. 18, 2017    (KR) .................. 10-2017-0119784

(51) Int. Cl.
| | | |
|---|---|---|
| *H01M 2/12* | (2006.01) | |
| *H01M 10/14* | (2006.01) | |
| *H01M 10/42* | (2006.01) | |
| *H01M 2/10* | (2006.01) | |
| *H01M 10/04* | (2006.01) | |

(52) U.S. Cl.
CPC ....... *H01M 2/1252* (2013.01); *H01M 2/1077* (2013.01); *H01M 2/1235* (2013.01); *H01M 10/0413* (2013.01); *H01M 10/4207* (2013.01); *H01M 2/1264* (2013.01); *H01M 2200/00* (2013.01); *H01M 2220/20* (2013.01)

(58) Field of Classification Search
CPC ............. H01M 2/1252; H01M 2/1235; H01M 2/1264; H01M 2/1077
See application file for complete search history.

(56) References Cited

U.S. PATENT DOCUMENTS

| | | | |
|---|---|---|---|
| 2015/0147605 A1 | 5/2015 | Kim et al. | |
| 2016/0133900 A1 | 5/2016 | Li et al. | |
| 2016/0197324 A1* | 7/2016 | DeKeuster | H01M 2/305 |
| | | | 429/82 |
| 2018/0108892 A1* | 4/2018 | Kim | H01M 2/1077 |
| 2019/0006650 A1* | 1/2019 | Bryla | H01M 2/127 |
| 2019/0097192 A1 | 3/2019 | Kim et al. | |

FOREIGN PATENT DOCUMENTS

| | | | | | |
|---|---|---|---|---|---|
| JP | 2004172099 A | * | 6/2004 | ............. | H01M 2/12 |
| JP | 2016-096129 A | | 5/2016 | | |
| KR | 10-2015-0061200 A | | 6/2015 | | |
| KR | 10-2017-0044473 A | | 4/2017 | | |
| KR | 20170044473 A | * | 4/2017 | ......... | H01M 2/1077 |
| KR | 20170047687 A | * | 5/2017 | ............ | H01M 2/043 |
| KR | 10-2017-0069003 A | | 6/2017 | | |
| KR | 20170090261 A | * | 8/2017 | ............. | H01M 2/12 |

* cited by examiner

*Primary Examiner* — Stephan J Essex
(74) *Attorney, Agent, or Firm* — Morgan, Lewis & Bockius LLP (57) ABSTRACT

Disclosed is a battery case, which includes a frame unit having an accommodation space formed therein so that a cell assembly including a plurality of stacked battery cells is accommodated therein, the frame unit having at least one open side surface; and a frame cover configured to cover the at least one open side surface and having an extinguishing space in which flame generated at the cell assembly is introduced and extinguished, the frame cover having a discharge unit communicating with an outside of the extinguishing space so that gas generated at the cell assembly and introduced into the extinguishing space is discharged to the outside of the extinguishing space.

17 Claims, 8 Drawing Sheets

BATTERY CASE, AND BATTERY PACK AND VEHICLE INCLUDING THE SAME

TECHNICAL FIELD

The present application claims priority to Korean Patent Application No. 10-2017-0119784 filed on Sep. 18, 2017 in the Republic of Korea, the disclosures of which are incorporated herein by reference.

The present disclosure relates to a battery case, and a battery pack and a vehicle including the same, and more particularly, to a battery case for extinguishing flame generated from a battery and discharging gas generated from the battery, and a battery pack and a vehicle including the same.

BACKGROUND ART

Secondary batteries commercially available at the present include nickel-cadmium batteries, nickel hydrogen batteries, nickel-zinc batteries, lithium secondary batteries and the like. Among them, the lithium secondary batteries are in the limelight since they have almost no memory effect compared to nickel-based secondary batteries and also have very low self-discharging rate and high energy density.

The lithium secondary battery mainly uses lithium-based oxide and carbonaceous material as a positive electrode active material and a negative electrode active material, respectively. The lithium secondary battery includes an electrode assembly in which a positive electrode plate and a negative electrode plate respectively coated with a positive electrode active material and a negative electrode active material are disposed with a separator being interposed therebetween, and an exterior in which the electrode assembly is accommodated and sealed together with an electrolyte.

Generally, a lithium secondary battery may be classified into a can-type secondary battery in which an electrode assembly is included in a metal can and a pouch-type secondary battery in which an electrode assembly is included in a pouch made of aluminum laminate sheets, depending on the shape of an exterior.

In recent years, secondary batteries have been widely used not only in small-sized devices such as portable electronic devices but also in medium-sized and large-sized devices such as vehicles and power storage devices. When being used in medium-sized and large-sized devices, a large number of secondary batteries are electrically connected to increase capacity and power. In particular, pouch-type secondary batteries are widely used for the medium-sized and large-sized devices since they are easy to be stacked. In addition, as a plurality of secondary batteries are accommodated in a pack case, a battery pack may be constructed.

Various characteristics are required for the battery pack, and a representative characteristic is safety. Further, the safety of the battery pack mounted on a vehicle is very important because it is directly related to the life of a passenger.

In particular, one of the important issues with regard to the safety of the battery pack is the direct exposure to flame. In the case of a battery pack, it is a priority to prevent a fire inside, but in some cases, a fire may occur inside the battery pack. At this time, in a conventional battery pack, the flame and gas generated from the fire occurring therein are discharged to the outside, which may cause a large fire and break or damage internal parts of the battery pack and other components around the battery pack. In particular, if a fire occurs in the battery pack mounted on a vehicle, the fire may be very dangerous to passengers. Further, when the battery pack is mounted on a hybrid vehicle or collided with another vehicle, if a fuel storage tank is exposed to flame or hot gas, the fuel may explode, which may lead to a major accident.

DISCLOSURE

Technical Problem

The present disclosure is directed to providing a battery case in which a frame cover covering a side surface of a frame unit extinguishes flame generated from a cell assembly and discharges gas to the outside to prevent a secondary fire, and a battery pack and a vehicle including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery case, comprising: a frame unit having an accommodation space formed therein so that a cell assembly including a plurality of stacked battery cells is accommodated therein, the frame unit having at least one open side surface; and a frame cover configured to cover the at least one open side surface and having an extinguishing space in which flame generated at the cell assembly is introduced and extinguished, the frame cover having a discharge unit communicating with an outside of the extinguishing space so that gas generated at the cell assembly and introduced into the extinguishing space is discharged to the outside of the extinguishing space.

Preferably, the frame cover may include a plurality of plates that form the extinguishing space.

Preferably, among the plurality of plates, a plate facing the cell assembly may have an inlet hole through which the flame and the gas are introduced into the extinguishing space.

Preferably, the frame cover may include a plurality of plates that form the extinguishing space.

Preferably, among the plurality of plates, a plate located at an upper portion of the extinguishing space may have an outlet hole through which the gas introduced from the extinguishing space to the discharge unit is discharged to the outside of the extinguishing space.

Preferably, the discharge unit may have a tube shape with an open upper portion and an open lower portion, the open upper portion may communicate with the outside through the outlet hole, and the open lower portion may be spaced apart from a plate among the plurality of plates, which is located at a lower portion of the extinguishing space.

Preferably, the discharge unit may have a cross section that is gradually increasing from the upper portion to the lower portion.

Preferably, the discharge unit may include a guide rail formed at an outer side thereof to guide a flowing direction of at least one of the flame and the gas introduced into the accommodation space.

Preferably, among the plurality of plates, the plate located at the upper portion of the extinguishing space may be at least partially inserted into the frame unit.

Preferably, the frame unit may have an opening formed at a location of the upper surface corresponding to the location of the outlet hole to discharge the gas flowing from the outlet hole to the outside.

A battery pack according to the present disclosure may include the battery case.

A vehicle according to the present disclosure may include the battery pack.

Advantageous Effects

According to the present disclosure, the sealing portion seals an accommodation space formed in the upper case and the lower case, which accommodate a cell assembly, and inner gas discharged out from the spacing formed between the upper sidewall of the upper case and the lower sidewall of the lower case passes or outer gas introducing into the spacing from the outside is blocked, thereby preventing a small flame generated inside the battery pack from growing into a large flame.

BEST MODE

The above objects, features and advantages will be described in detail below with reference to the accompanying drawings, so that those skilled in the art to which the present disclosure belongs can easily implement the technical idea of the present disclosure. In the explanations of the present disclosure, if it is deemed that any specific explanation of the related technology can unnecessarily obscure the gist of the present disclosure, the detailed explanation may be omitted. Hereinafter, a preferred embodiment according to the present disclosure will be described in detail with reference to the accompanying drawings. In the drawings, the same reference numerals are used to indicate the same or similar components.

Figure 1:
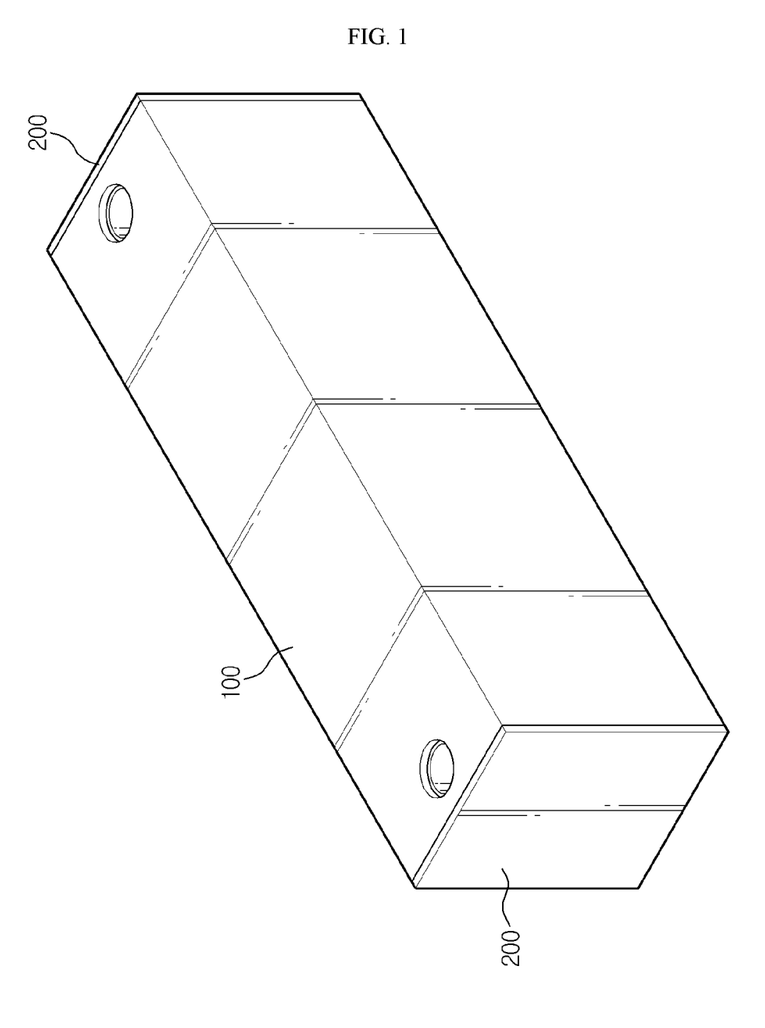
FIG. 1 is a perspective view showing a battery case according to an embodiment of the present disclosure.
Figure 2:
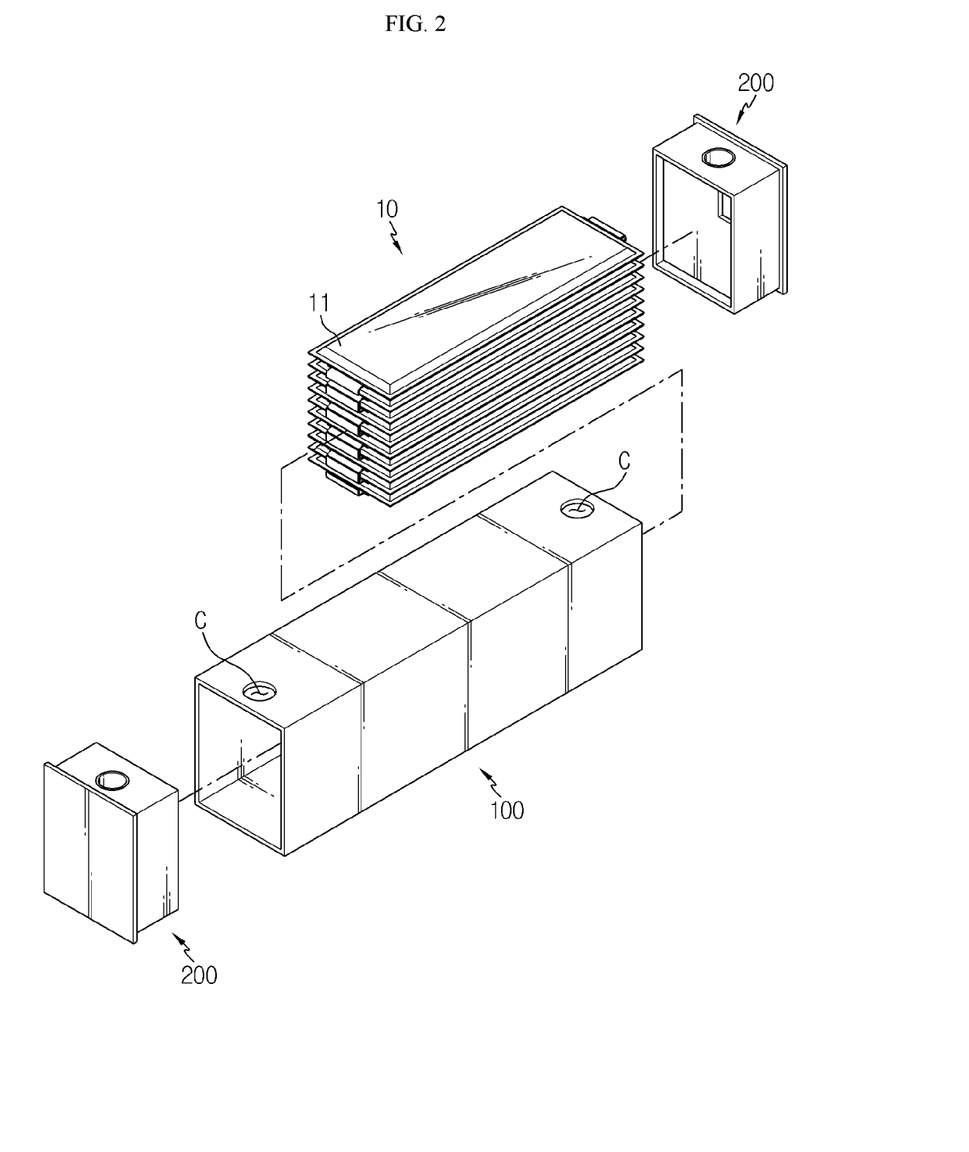
FIG. 2 is an exploded perspective view showing a battery case and a battery according to an embodiment of the present disclosure.
Figure 3:
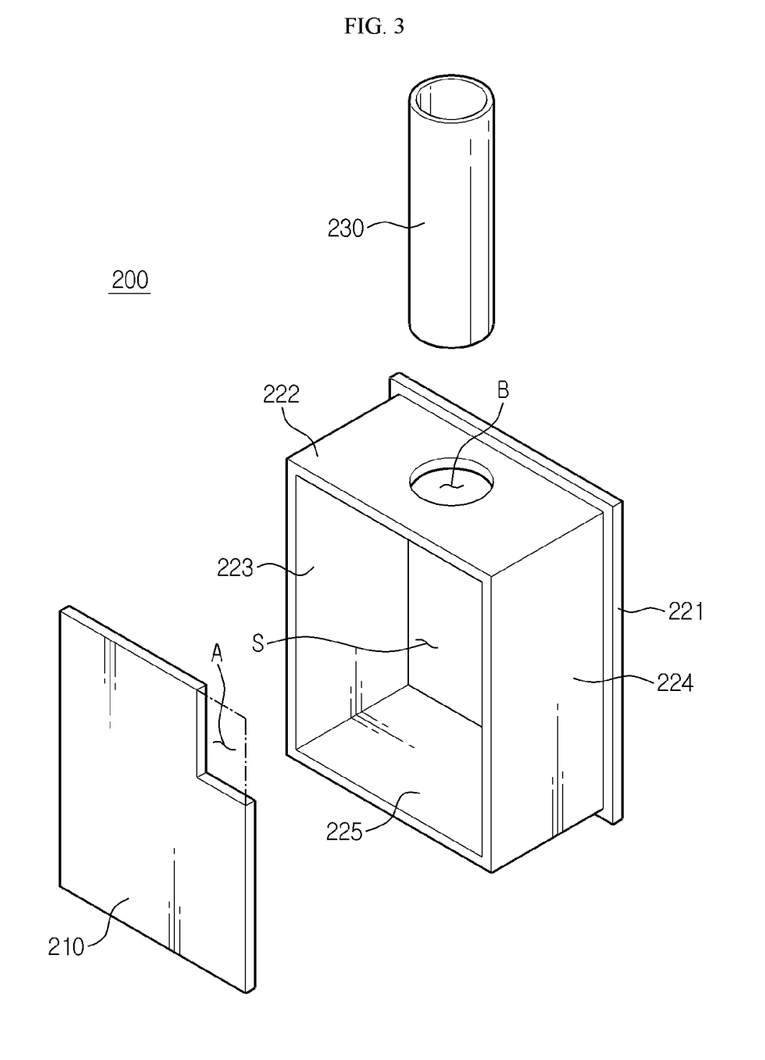
FIG. 3 is an exploded perspective view showing a frame cover of the battery case according to an embodiment of the present disclosure.
Figure 4:
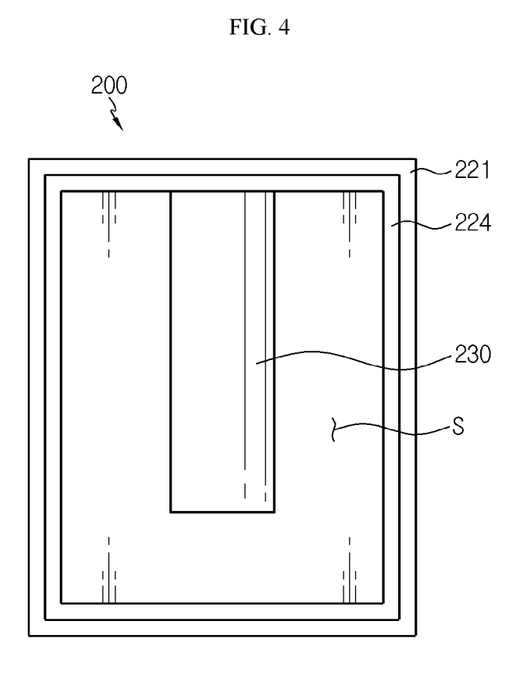
FIG. 4 is a diagram showing an extinguishing space of the frame cover of the battery case according to an embodiment of the present disclosure.

FIG. 1 is a perspective view showing a battery case according to an embodiment of the present disclosure, FIG. 2 is an exploded perspective view showing a battery case and a battery according to an embodiment of the present disclosure, FIG. 3 is an exploded perspective view showing a frame cover of the battery case according to an embodiment of the present disclosure, and FIG. 4 is a diagram showing an extinguishing space of the frame cover of the battery case according to an embodiment of the present disclosure.

Referring to FIGS. 1 to 4, a battery case according to an embodiment of the present disclosure may include a frame unit 100 and a frame cover 200.

As shown in FIG. 2, the frame unit 100 may be formed in an accommodation space in which a cell assembly 10 including a plurality of stacked battery cells 11 is accommodated.

Here, the accommodation space may be formed with a plurality of plates corresponding to the shape of the cell assembly 10. That is, as shown in FIG. 2, the accommodation space of the frame unit 100 may be formed by welding edges of neighboring plates, among four plates.

Meanwhile, the frame unit 100 may be formed to have an open side surface. More specifically, the frame unit 100 may have a rectangular parallelepiped shape in which a front surface and a rear surface are opened.

Accordingly, if flame and gas are generated at the cell assembly 10 accommodated in the frame unit 100, the generated flame and gas may flow toward the open front surface and the rear surface of the frame unit 100.

Meanwhile, the plurality of battery cells 11 of the cell assembly 10 accommodated in the frame unit 100 of the battery case according to the present disclosure is not limited to any specific type.

The frame cover 200 covers the open side surface of the frame unit 100 and may have an extinguishing space S in which the flame generated at the cell assembly 10 is introduced and extinguished. To this end, as shown in FIG. 3, the frame cover 200 may include a plurality of plates 210, 221, 222, 223, 224, 225, which form the extinguishing space S of the frame unit 100 and are welded at their adjacent edges to correspond to the open side surface.

In an embodiment, the plurality of plates 210, 221, 222, 223, 224, 225 may include a barrier plate 210, an outer plate 221, an upper plate 222, a lower plate 225, a left plate 223 and a right plate 224. Also, in an embodiment, the barrier plate 210, the outer plate 221, the upper plate 222, the lower plate 225, the left plate 223 and the right plate 224 included in the plurality of plates 210, 221, 222, 223, 224, 225 may have a rectangular parallelepiped shape by welding adjacent edges thereof.

As described above, the barrier plate 210, the outer plate 221, the upper plate 222, the lower plate 225, the left plate 223 and the right plate 224 may form the extinguishing space S by welding adjacent edges thereof.

Here, the barrier plate 210 may be a plate facing the cell assembly 10, among the plurality of plates 210, 221, 222, 223, 224, 225 provided at the frame cover 200 to form the extinguishing space S. Also, the outer plate 221 may be a plate facing the outside of the battery case, among the plurality of plates 210, 221, 222, 223, 224, 225 provided at the frame cover 200 to form the extinguishing space S. Also, the upper plate 222 may be a plate located at an upper portion of the extinguishing space S, among the plurality of plates 210, 221, 222, 223, 224, 225 provided at the frame cover 200 to form the extinguishing space S. Also, the lower plate 225 may be a plate located at a lower portion of the extinguishing space S, among the plurality of plates 210, 221, 222, 223, 224, 225 provided at the frame cover 200 to form the extinguishing space S. Also, the left plate 223 may be a plate located at a left side of the extinguishing space S, among the plurality of plates 210, 221, 222, 223, 224, 225 provided at the frame cover 200 to form the extinguishing space S. Also, the right plate 224 may be a plate located at a right side of the extinguishing space S, among the plurality of plates 210, 221, 222, 223, 224, 225 provided at the frame cover 200 to form the extinguishing space S.

The frame cover 200 may be configured so that the barrier plate 210, the upper plate 222, the lower plate 225, the left plate 223 and the right plate 224, except for the outer plate 221, are inserted into the open side surface of the frame unit 100, and the outer plate 221 covers the open side surface of the frame unit 100.

For this, the rectangular space formed by coupling the upper plate 222, the lower plate 225, the left plate 223 and the right plate 224 may correspond to the shape of the open side surface of the frame unit 100. Accordingly, the outer surfaces of the upper plate 222, the lower plate 225, the left plate 223 and the right plate 224 may be closely adhered to the inner side surface of the frame unit 100.

Also, the outer plate 221 may be formed wider than the open side surface of the frame unit 100 to cover the open side surface of the frame unit 100.

According to this configuration of the present disclosure, the frame cover 200 may cover the open side surface of the frame unit 100 without being separated from the frame unit 100, thereby preventing flame and gas generated at the cell assembly 10 from leaking out between the frame cover 200 and the frame unit 100.

Meanwhile, among the plurality of plates 210, 221, 222, 223, 224, 225, the barrier plate 210 may be located at an innermost side of the open side surface of the frame unit 100 to primarily block the flame and gas generated at the cell assembly 10.

Also, the barrier plate 210 may have an inlet hole A through which the flame and gas generated at the cell assembly 10 are introduced into the extinguishing space S. More specifically, the inlet hole A formed in the barrier plate 210 may be formed at a top end of the barrier plate 210 so that flame and gas floating thereon may be introduced into the extinguishing space S.

In addition, the inlet hole A formed in the barrier plate 210 may be formed at a right end or a left end of the top end of the barrier plate 210 so that the flame and gas introduced into the extinguishing space S flows while turning around the outlet hole 230 on the extinguishing space S.

That is, the inlet hole A formed in the barrier plate 210 may be formed at the top right side or the top left side of the barrier plate 210.

Meanwhile, the upper plate 222 may have an outlet hole B formed at a position corresponding to the position of the open upper portion of the discharge unit 230 and the opening C formed in the upper side surface of the frame unit 100.

That is, the upper portion and the lower portion of the outlet hole B formed in the upper plate 222 may be respectively connected to the opening upper portion of the discharge unit 230 and the opening C formed in the upper surface of the frame unit 100 so that the extinguishing space S communicates with the outside of the battery case.

Hereinafter, the process after the flame and gas are introduced into the extinguishing space S of the frame cover 200 will be described.

Figure 5:
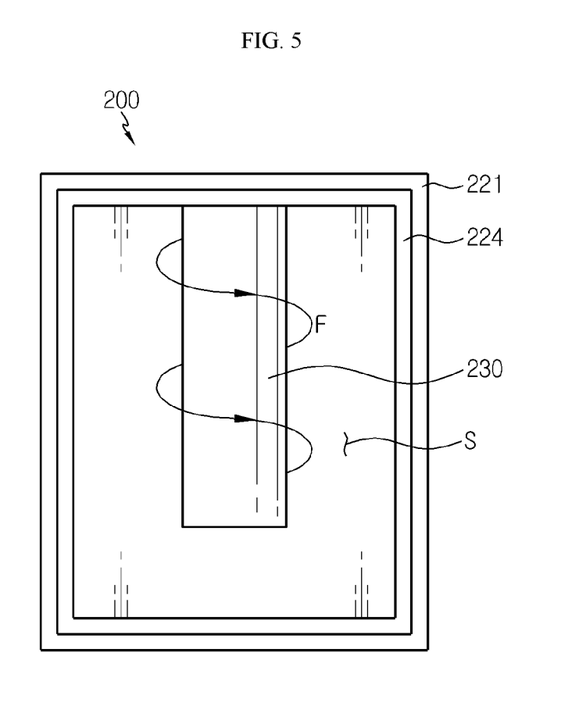
FIG. 5 is a diagram for illustrating a state where flame flows in the extinguishing space of the frame cover of the battery case according to an embodiment of the present disclosure.
Figure 6:
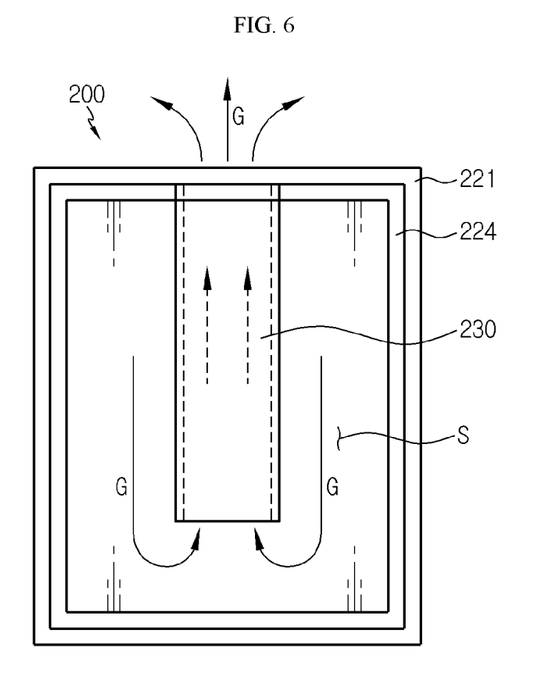
FIG. 6 is a diagram for illustrating a state where gas flows in the extinguishing space of the frame cover of the battery case according to an embodiment of the present disclosure.

FIG. 5 is a diagram for illustrating a state where flame flows in the extinguishing space of the frame cover of the battery case according to an embodiment of the present disclosure, and FIG. 6 is a diagram for illustrating a state where gas flows in the extinguishing space of the frame cover of the battery case according to an embodiment of the present disclosure.

Referring to FIGS. 5 and 6 further, the frame cover 200 may include a discharge unit 230 configured so that the flame F and the gas G generated at the cell assembly 10 and introduced into the extinguishing space S flow along an outer circumference thereof and communicating with the outside of the extinguishing space S to discharge the gas G introduced into the extinguishing space S to the outside of the extinguishing space S.

In an embodiment, the discharge unit 230 has a cylindrical shape so that the flame F and the gas G introduced into the extinguishing space S flow on the outer circumference of the discharge unit 230 with minimal flow resistance.

For this, the discharge unit 230 may have a tubular shape having an open upper portion and an open lower portion. The open upper portion of the discharge unit 230 may communicate with the outside through the outlet hole B of the upper plate 222 and the opening C formed in the upper surface of the frame unit 100. Also, the open lower portion of the discharge unit 230 may be spaced apart from the lower plate 225 located at the lower portion of the extinguishing space S so that the gas G introduced into the extinguishing space S may flow into the discharge unit 230.

In other words, the flame F and the gas G generated at the cell assembly 10 may flow into the extinguishing space S through the inlet hole A formed in the barrier plate 210, and the flame F and the gas G introduced into the extinguishing space S may flow on the outer circumference of the discharge unit 230.

More specifically, as shown in FIG. 5, the flame F introduced into the extinguishing space S may flow while rotating around the outer circumference of the discharge unit 230 and be extinguished while flowing to the lower portion of the extinguishing space S.

Also, as shown in FIG. 6, the gas G introduced into the extinguishing space S may flow to the lower portion of the extinguishing space S along the outer circumference of the discharge unit 230 and flow into the open lower portion of the discharge unit 230. After that, the gas G introduced into the open lower portion of the discharge unit 230 may flow to the upper portion along the inside of the discharge unit 230 and be discharged to the outside of the battery case.

According to this configuration of the present disclosure, the flame F and the gas G generated at cell assembly 10 may flow into the extinguishing space S of frame cover 200, and among the flame F and the gas G introduced into extinguishing space S, the flame F may be extinguished while flowing through the extinguishing space S and the gas G may be discharged to the outside through the discharge unit 230 while flowing in the extinguishing space S. Accordingly, if flame F and gas G are generated at the cell assembly 10 received in the battery case, the battery case according to the present disclosure may prevent the occurrence of a secondary fire or a large-scale fire by extinguishing the flame F in the extinguishing space S of the frame cover 200 and discharging the gas G to the outside.

Hereinafter, a battery case according to another embodiment of the present disclosure will be described.

Figure 7:
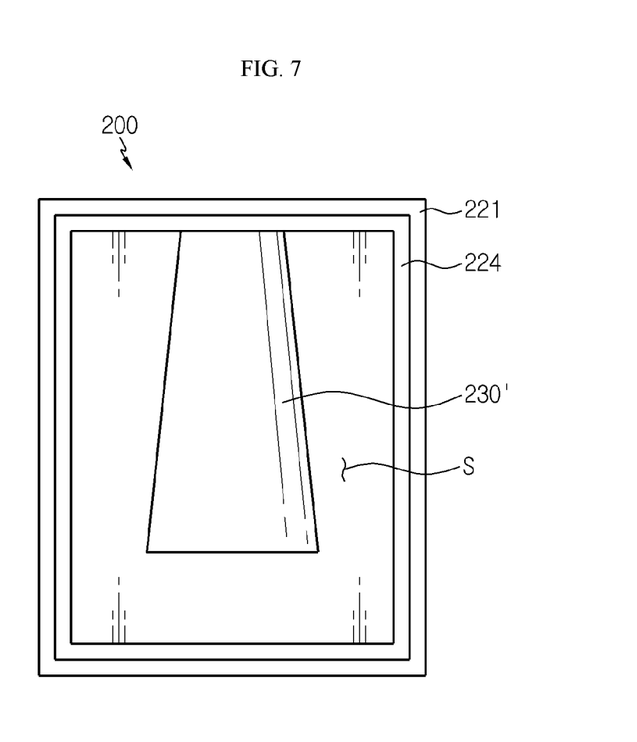
FIG. 7 is a diagram showing an extinguishing space of a frame cover of a battery case according to another embodiment of the present disclosure.

FIG. 7 is a diagram showing an extinguishing space of a frame cover of a battery case according to another embodiment of the present disclosure.

The battery case according to another embodiment of the present disclosure is different from the battery case according to an embodiment of the present disclosure just in the configuration and role of the discharge unit 230', and the configurations and roles of other components are substantially identical. Thus, the repeated explanation will be omitted.

Referring to FIG. 7, in the battery case according to another embodiment of the present disclosure, the frame cover 200 may include a discharge unit 230' having a cross section that is gradually increasing from an upper portion thereof toward a lower portion thereof.

More specifically, the discharge unit 230' according to another embodiment may have a tubular shape with an open upper portion and an open lower portion. That is, the open upper portion of the discharge unit 230' may have a smaller area than the open lower portion so that the upper portion has a conical shape. Accordingly, when the flame and gas introduced into the extinguishing space S flow from the upper portion to the lower portion along the outer circumference of the discharge unit 230', the flow resistance may become larger as the flame and gas flow further to the lower portion. As a result, the flame and gas introduced into the extinguishing space S may have an increased flow time at the upper portion of the extinguishing space S, compared to the lower portion of the extinguishing space S.

In particular, as the flow time increases at the upper portion of the extinguishing space S in comparison to the lower portion of the extinguishing space S, the flame introduced into the extinguishing space S may be extinguished at the upper portion of the extinguishing space S, thereby preventing the flame from being introduced into the discharge unit 230' and discharged to the outside of the battery case.

Meanwhile, the gas introduced into the extinguishing space S may easily flows to the lower portion of the discharge unit 230', which is opened wider than the upper portion, so that the amount of gas discharged from the extinguishing space S to the outside of the battery case may be increased.

Figure 8:
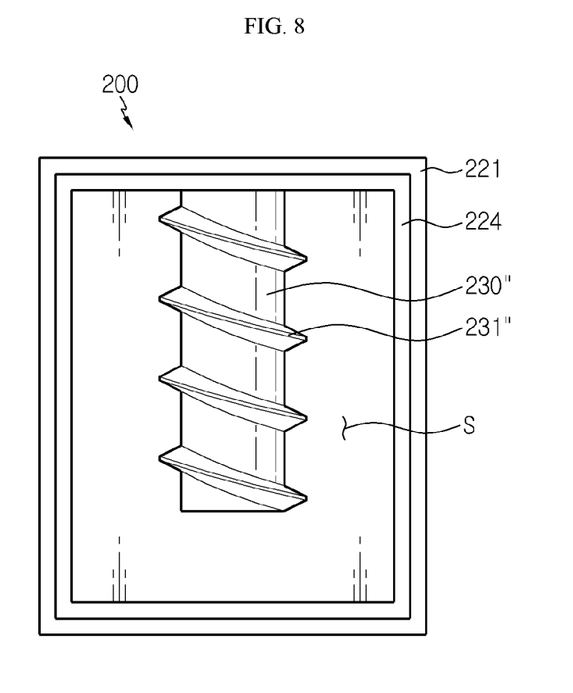
FIG. 8 is a diagram showing an extinguishing space of a frame cover of a battery case according to still another embodiment of the present disclosure.

FIG. 8 is a diagram showing an extinguishing space of a frame cover of a battery case according to still another embodiment of the present disclosure.

The battery case according to still another embodiment of the present disclosure is different from the battery case according to an embodiment of the present disclosure just in the configuration and role of the discharge unit 230", and the configurations and roles of other components are substantially identical. Thus, the repeated explanation will be omitted.

Refereeing to FIG. 8, the discharge unit 230" provided at the frame cover 200 of the battery case according to still another embodiment of the present disclosure may include a guide rail 231" formed at an outer side thereof to guide a flowing direction of at least one the flame and gas introduced into the accommodation space S.

More specifically, the discharge unit 230" according to another embodiment may include a guide rail 231" protruding at an outer side along the outer circumference.

The interval between the protruding portions of the guide rail 231" may be preset such that the flame and gas introduced into the extinguishing space S flow more along the outer circumference of the discharge unit 230".

By doing so, the flame and gas introduced into the extinguishing space S flow while rotating around the outer circumference of the discharge unit 230" several times, thereby increasing the flow time at the upper portion of the extinguishing space S in comparison to the lower portion of the extinguishing space S.

In particular, as the flow time at the upper portion of the extinguishing space S increases compared to the lower portion of the extinguishing space S, the flame introduced into the extinguishing space S may be extinguished at the upper portion of the extinguishing space S, preventing the flame from being introduced into the discharge unit 230" and discharged to the outside of the battery case.

The present disclosure can be substituted, modified or changed in various ways without departing from the scope of the present disclosure by those skilled in the art and thus is not limited to the above embodiments and the accompanying drawings.

REFERENCE SIGNS

100: frame unit
200: frame cover
230: discharge unit

What is claimed is:

1. A battery case, comprising:
a frame unit having an accommodation space formed therein so that a cell assembly including a plurality of stacked battery cells is accommodated therein, the frame unit having at least one opening; and
a frame cover configured to cover the at least one opening, the frame cover having a box shaped structure inserted into the opening to define an extinguishing space in which a flame generated at the cell assembly is introduced and extinguished, the frame cover having a discharge unit communicating with an outside of the extinguishing space so that gas generated at the cell assembly and introduced into the extinguishing space is discharged to the outside of the extinguishing space.

2. The battery case according to claim 1,
wherein the frame cover includes a plurality of plates that define the extinguishing space,
wherein an inner one of the plates facing the cell assembly has an inlet hole configured to connect the accommodation space and the extinguishing space, and
wherein an outer one of the plates opposite to the inner one of the plates covers the at least one opening.

3. The battery case according to claim 1,
wherein the frame cover includes a plurality of plates that define the extinguishing space, and
wherein an upper one of the plates located at an upper portion of the extinguishing space has an outlet hole through which the gas introduced from the extinguishing space to the discharge unit is discharged to the outside of the extinguishing space.

4. The battery case according to claim 3,
wherein the discharge unit has a tube shape with an open upper portion and an open lower portion, the open upper portion communicates with the outside through the outlet hole, and the open lower portion is spaced apart from a plate among the plurality of plates, which is located at a lower portion of the extinguishing space.

5. The battery case according to claim 4,
wherein the discharge unit has a cross section that is gradually increasing from the upper portion to the lower portion.

6. The battery case according to claim 4,
wherein the discharge unit includes a guide rail formed at an outer side thereof to guide a flowing direction of at least one of the flame and the gas introduced into the accommodation space.

7. The battery case according to claim 3,
wherein among the plurality of plates, the plate located at the upper portion of the extinguishing space is at least partially inserted into the frame unit, and
wherein the frame unit has an opening formed at a location of the upper surface corresponding to the location of the outlet hole to discharge the gas flowing from the outlet hole to the outside.

8. A battery pack comprising the battery case according to claim 1.

9. A vehicle comprising the battery case according to claim 1.

10. The battery case according to claim 2,
wherein a surface of the frame unit adjacent to the opening defines a discharge opening therethrough, and
wherein an upper one of the plates at an upper portion of the extinguishing space defines an outlet hole, the outlet hole and the discharge opening being aligned when the frame cover is inserted into the frame unit such that the gas is discharged from the extinguishing space to an outside of the battery case.

11. The battery case according to claim 10,
wherein the discharge unit is disposed through the outlet hole and the discharge opening.

12. The battery case according to claim 11,
wherein the inner and the upper ones of the plates are inserted into the frame unit when the frame cover is inserted into the frame unit.

13. The battery case according to claim 1,
wherein the extinguishing space defines a rectangular box shape.

14. The battery case according to claim 1,
wherein the frame unit has first and second openings at opposing sides of the frame unit; and
wherein the frame cover includes first and second frame covers to be inserted into and to cover the first and second openings, respectively.

15. A battery case, comprising:
a frame unit having an accommodation space formed therein so that a cell assembly including a plurality of stacked battery cells is accommodated therein, the frame unit having at least one opening; and
a frame cover configured to cover the at least one opening, the frame cover including a plurality of plates to define an extinguishing space in which a flame generated at the cell assembly is introduced and extinguished, the frame cover having a discharge unit communicating with an outside of the extinguishing space so that gas generated at the cell assembly and introduced into the extinguishing space is discharged to the outside of the extinguishing space,
wherein the plurality of plates includes an outer plate to cover the opening, a plurality of side plates extended from the outer plate, and an inner plate connected to the side plates opposite to the outer plate such that the side plates and the inner plate are inserted into the opening.

16. The battery case according to claim 15, wherein the plurality of side plates have a shape to correspond to the opening.

17. The battery case according to claim 15, wherein the plurality of side plates contact inner surfaces of the frame unit.

* * * * *